(12) United States Patent
Tetzlaff

(10) Patent No.: US 8,790,428 B2
(45) Date of Patent: Jul. 29, 2014

(54) METHOD AND DEVICE FOR PRODUCING SYNTHESIS GAS FROM BIOMASS

(76) Inventor: Karl-Heinz Tetzlaff, Kelkheim (DE)

( * ) Notice: Subject to any disclaimer, the term of this patent is extended or adjusted under 35 U.S.C. 154(b) by 982 days.

(21) Appl. No.: 12/933,189

(22) PCT Filed: Mar. 18, 2009

(86) PCT No.: PCT/EP2009/053195
§ 371 (c)(1),
(2), (4) Date: Dec. 9, 2010

(87) PCT Pub. No.: WO2009/115549
PCT Pub. Date: Sep. 24, 2009

(65) Prior Publication Data
US 2011/0083367 A1    Apr. 14, 2011

(30) Foreign Application Priority Data

Mar. 18, 2008    (DE) .................. 10 2008 014 799

(51) Int. Cl.
*C01B 3/36* (2006.01)
(52) U.S. Cl.
USPC ........................................ 48/197 R
(58) Field of Classification Search
None
See application file for complete search history.

(56) References Cited

U.S. PATENT DOCUMENTS

| | | | |
|---|---|---|---|
| 3,128,164 A | 4/1964 | Moritz et al. | |
| 4,278,446 A | 7/1981 | Von Rosenberg, Jr. et al. | |
| 4,353,713 A * | 10/1982 | Cheng | 48/202 |
| 4,402,823 A * | 9/1983 | Bertelsen | 208/410 |
| 4,441,892 A | 4/1984 | Schuster | |
| 4,497,637 A * | 2/1985 | Purdy et al. | 48/111 |
| 4,799,937 A | 1/1989 | Nieminen | |
| 6,133,499 A * | 10/2000 | Horizoe et al. | 110/234 |
| 6,149,765 A * | 11/2000 | Mansour et al. | 162/29 |
| 6,808,543 B2 | 10/2004 | Paisley | |
| 7,214,252 B1 * | 5/2007 | Krumm et al. | 48/198.2 |
| 7,658,776 B1 * | 2/2010 | Pearson | 48/62 R |
| 2003/0010267 A1 * | 1/2003 | Tischer et al. | 110/229 |
| 2005/0261537 A1 * | 11/2005 | Stell et al. | 585/648 |
| 2006/0089519 A1 * | 4/2006 | Stell et al. | 585/648 |
| 2007/0183966 A1 * | 8/2007 | Nakagawa et al. | 423/648.1 |
| 2009/0077888 A1 * | 3/2009 | Zander et al. | 48/78 |
| 2010/0024297 A1 * | 2/2010 | Suda et al. | 48/61 |
| 2010/0223846 A1 * | 9/2010 | Yang et al. | 48/61 |

FOREIGN PATENT DOCUMENTS

| | | |
|---|---|---|
| CN | 1148080 A | 4/1997 |
| DE | 1931166 | 1/1971 |
| DE | 3004111 A1 | 8/1981 |
| DE | 3228532 A1 | 2/1984 |
| DE | 102004045772 A1 | 3/2006 |

(Continued)

OTHER PUBLICATIONS

Bolhar-Nordenkampf et al., "Scale-up of a 100kWth pilot FICFB-gasifier to a 8 MWth FICFB-gasifier demonstration plant in Gussing (Austria)", Presentation at the 1st International Ukrainian Conference on Biomass for Energy, Sep. 23-27, 2002, 4 pages, Kiev, Ukraine.

*Primary Examiner* — Imran Akram
(74) *Attorney, Agent, or Firm* — The Webb Law Firm

(57) ABSTRACT

A method and a device for producing synthesis gas from biomass, wherein the biomass is decomposed into pyrolysis coke and pyrolisis gas in at least one pyrolisis reactor, the pyrolysis coke is introduced into the fluidized bed of a synthesis gas reactor and the pyrolysis gas is used as fluidization gas for the synthesis gas reactor.

11 Claims, 4 Drawing Sheets

(56) References Cited

FOREIGN PATENT DOCUMENTS

| | | |
|---|---|---|
| DE | 60120957 T2 | 2/2007 |
| EP | 0979857 A2 | 2/2000 |
| EP | 1312662 A2 | 5/2003 |
| FR | 2863920 A1 | 6/2005 |
| GB | 2164660 A | 3/1986 |
| JP | 3989838 B2 | 7/2007 |
| WO | 8601821 A1 | 3/1986 |

* cited by examiner

METHOD AND DEVICE FOR PRODUCING SYNTHESIS GAS FROM BIOMASS

BACKGROUND OF THE INVENTION

1. Field of the Invention

The invention relates to a method and a device for the thermochemical production of synthesis gas from energy sources containing carbon, in particular from biomass.

2. Description of the Related Art

Synthesis gas from biomass is the starting product for the future solar hydrogen economy, in which the hydrogen is delivered to the end customer by a pipeline. Owing to the high efficiency in the decentral conversion of hydrogen into electricity, a surplus of electricity is obtained for almost all end consumers. Electricity and heat thus have the same value in this heat-controlled economy. For this reason, the use of electrical energy to provide the enthalpy of reaction for the production of synthesis gas is economical. Since electricity is only tradeable to a limited extent in the event of an electricity surplus, solar electricity, for example from wind energy, must be converted by water electrolysis into hydrogen and oxygen. The oxygen is therefore available for thermochemical gasification. In order to manage the logistics in the provision of biomass from agriculture and forestry, a plant size of between 20 and 500 MW is optimal. The plants should also be able to operate at an elevated pressure of between 6 and 40 bar, so that the gas produced can be fed directly into the regional gas network.

Essentially three methods are known for the thermochemical production of synthesis gas from biomass.

For the low power range, predominantly fixed bed gasifiers are encountered in a number of variants. Fixed bed gasifiers are adapted for a consistently high quality of biomass and are not appropriate for the production of high-quality synthesis gas which is suitable for further processing to form hydrogen.

The entrained flow gasifier is suitable in particular for high powers above 1 GW, because the reactor size of the entrained flow gasifier is relatively small. For small plants, the entrained flow gasifier is uneconomical owing to the high equipment outlay. The entrained flow gasifier requires substantially dry biomass or intermediate products, because the entrained flow gasifier operates at high temperatures with pure oxygen. The ash melts vitreously and is not usable as inorganic fertiliser. This is problematic in view of fertilisers becoming more expensive and less available.

The fluidised bed reactor has its strengths in the medium industrial power range of from 1 MW to 1 GW. When dealing with fluidised bed reactors, distinction is made between autothermal and allothermal gasification. In the case of autothermal gasification, a part of the biomass in the fluidised bed reactor is burnt in order to sustain the endothermic reactions taking place. In the case of allothermal gasification, the heat required is introduced by heat transfer. This may, for example, be done using heating rods in the fluidised bed or using a circulating heat-exchange medium. Sand, which is heated in a second reactor by burning a part of the biomass, is mostly used as a heat-exchange medium. There is such a gasifier with a thermal power of 8 MW in Güssing, Austria. This plant was presented at the 1$^{st}$ International Ukrainian Conference on BIOMASS FOR ENERGY; Sep. 23-27, 2002, Kiev, Ukraine by M. Bolhar-Nordenkampf et al. under the title: "Scale-up of a 100 KW$_{th}$ pilot FICFB to 8 MW$_{th}$ FICFB-gasifier demonstration plant in Güssing (Austria)". DE 10 2004 045772 A1 discloses a method with a circulating heat-exchange medium, which additionally uses the heat tonality in the conversion of CaO to $CaCO_3$. The fluidised bed reactor is operated below the sintering temperature of the ash being formed, which makes the ash usable as an inorganic fertiliser.

Oxygen, air and steam are used as a fluidisation gas and oxidising agent for the carbon in the synthesis gas reactor with a fluidised bed. In allothermal gasification, generally only steam is used. Autothermal gasification is operated with air. Pure oxygen is used in mixtures with steam and air, because pure oxygen would lead to local overheating in the fluidised bed. The use of air leads to dilution of the synthesis gas with nitrogen and $CO_2$, which makes exploitation for electricity generation and further processing to form products such as hydrogen, methane, methanol or liquid propellants difficult. The provision of steam requires additional outlay of energy and increases the investment costs.

According to the prior art, the biomass is fed directly into the fluidised bed of the synthesis gas reactor. In the fluidised bed, the pyrolysis to form primary tars and the final reaction to form synthesis gas take place simultaneously within a short time. The tar content in the synthesis gas is therefore very high. The tar has to be removed by elaborate methods. Tar build-ups in apparatus furthermore often lead to failure of the entire plant.

Among all the known gasification methods, gasification in a fluidised bed reactor is distinguished in that the ash is not melted and can therefore be used as inorganic fertiliser in agriculture. The synthesis gas obtained does, however, have a high tar content. This is a great disadvantage for using the synthesis gas.

SUMMARY OF THE INVENTION

It is the object of the invention to avoid the explained disadvantages in the generation of synthesis gas from biomass.

Here, biomass is intended to mean all substances of biological origin. Synthesis gas consists predominantly of $H_2$, CO, $CO_2$ and $CH_4$.

Biomass for energy purposes usually contains more water than is necessary for the allothermal production of a hydrogen-rich synthesis gas. Thus, when biomass is cleaved by pyrolysis or carbonisation into pyrolysis coke and pyrolysis gas, enough steam is available in the pyrolysis gas in order to oxidise the carbon of the biomass to form CO and $CO_2$. The pyrolysis gas can therefore advantageously be used as a fluidisation gas for a synthesis gas reactor with a fluidised bed. The provision of steam as a fluidisation gas can therefore be obviated. Excess steam would reduce the efficiency of the plant. In order to provide the energy requirement of the endothermic reactions to form synthesis gas, a supply of energy into the synthesis gas reactor is necessary, for example by internally placed heating or from a sand circuit in conjunction with a separate reactor. Technologies for heating a fluidised bed reactor are known per se. In the event of high gas speeds, a part of the fluidised bed will be extracted and must be precipitated using a cyclone and recycled into the reactor. This is referred to as a circulating fluidised bed. In the event of lower gas speeds, only fine particles and ash are extracted from the fluidised bed. This is referred to as a stationary fluidised bed. The method according to the invention is suitable for all forms of fluidised beds.

The pyrolytic decomposition of biomass is known per se. DE 601 20 957 T2 describes how the biomass can be carbonised using the sensible heat of the process by direct heating of the biomass via a wall or indirect heating with superheated steam. The use of oxygen for carbonisation to form pyrolysis gas and pyrolysis coke is also known per se.

The pyrolysis process may be split between a plurality of reactors, for example into low-temperature pyrolysis for using the sensible heat of the synthesis gas and downstream processes with exothermal heat tonality, and into high-temperature pyrolysis in which volatile tar-forming constituents of the biomass are driven out of the pyrolysis coke. Merely by using this substantially de-tarred pyrolysis coke, the tar content in the synthesis gas after the synthesis gas reactor can already be reduced significantly.

The tar content can be reduced even further if the pyrolysis gas is heated before entry into the fluidised bed of the synthesis gas reactor by a heating device or adding oxygen to temperatures of from 850° C. to 1600° C., preferably to temperatures of from 900° C. to 1300° C., particularly preferably to temperatures of from 950° C. to 1200° C. The tars in the pyrolysis gas will thereby be substantially broken down. If the temperature is selected to be higher than the ash melting point, it is advantageous to remove dust from the pyrolysis gas beforehand, otherwise a similarly large outlay for removing the molten ash is required as in entrained flow reactors.

When the superheated pyrolysis gas enters the fluidised bed of the synthesis gas reactor, the gas is cooled by quenching to from 850° C. to 700°. The lowest amount of tar in the synthesis gas is then achieved when the pyrolysis is carried out until the pyrolysis coke is just sufficient for chemical quenching. In this case, the sensible heat of the superheated fluidisation gas is used to cater for the endothermic reaction of the pyrolysis coke to form synthesis gas. It is thus not necessary to heat the synthesis gas reactor in this case.

If the pyrolysis is operated as high-temperature pyrolysis at temperatures of between 500° C. and 800° C., the reaction time can be substantially shortened in comparison with low-temperature pyrolysis. In the case of high-temperature pyrolysis, almost pure carbon remains in the pyrolysis coke. The volatile constituents are converted into pyrolysis gas. Primary tars are already converted into secondary and tertiary tars in this case.

The high-temperature pyrolysis may be preceded by a plurality of low-temperature pyrolyses, which facilitates exploitation of the sensible heat from the process.

In principle, the heat for the pyrolysis may be transferred indirectly through a wall. This requires large transfer surface areas and assistance of the heat input by moving the biomass or the pyrolysis coke.

The biomass or the pyrolysis coke may also be heated directly by hot gases or by a partial oxidation with oxygen. The pyrolysis gas, which is heated by means of a gas circuit and a heater, is expediently used as a hot gas. The hot gas may flow through a moving bed of biomass or pyrolysis coke. Contact with the hot gas may also be established by stirring up the pyrolysis coke by means of stirring components.

The time for the pyrolysis can be shortened even further if the pyrolysis is carried out in a fluidised bed. In a fluidised bed, the material transport is increased greatly by comminuting the biomass or the pyrolysis coke. The comminution may be increased by adding an inert bed material, such as sand. It is advantageous to use the waste heat from the process for multistage pyrolysis. A fluidised bed allows heating by tubes or rods, because the heat transfer in a fluidised bed is very good. It is, however, also possible to introduce the heat energy at least partially by means of the pyrolysis gas. To this end, the pyrolysis gas may be cycled by means of a blower. As an alternative, the heat supply may also take place by partial oxidation with oxygen.

It is advantageous for the pyrolysis gas to be fed through a catalyst bed before entry into the synthesis gas reactor. The catalyst bed may be arranged below the fluidised bed of the synthesis gas reactor. The catalyst may be selected so that tars and methane can preferably be converted into synthesis gas. The pyrolysis gas does not then need to be heated too greatly. For example, carrier-fixed transition metals such as nickel are suitable as catalysts. The catalyst may also remove ammonia from the superheated pyrolysis gas.

When processing the synthesis gas further, for example to form hydrogen, methane and higher hydrocarbons must be separated and fed back to the synthesis gas reactor. Mixing these gases with the heated pyrolysis gas leads to chemical quenching in the gas phase, which may be assisted catalytically. In this way, the incoming fluidisation gas is cooled and places less demands on the freedom from the dust and the design. The cooling may be assisted by adding cold gases.

The sensible heat of the synthesis gas can be introduced in the case of large industrial plants only with great outlay through the wall of a single screw conveyor line, as described in DE 601 20 957 T2. This would lead the geometrical problems. It is therefore proposed to arrange the screw conveyors in the manner of a tube bundle heat exchange. This limits the apparatus dimensions.

Fluidised bed reactors are only limitedly capable of a partial load. This applies in particular to the method according to the invention, since the amount of fluidisation gas cannot be adjusted arbitrarily, unlike when supplying separately generated steam. In order nevertheless to set up a large control range, according to Claim 9 the fluidisation gas is expediently to be fed in at the head of the fluidised bed reactor in question, while circumventing the fluidised bed reactor. In the case of the synthesis gas reactor, the superheated pyrolysis gas is mixed with the synthesis gas before introduction into the fluidised bed.

The invention furthermore relates to a device for carrying out the method according to the invention.

DESCRIPTION OF THE PREFERRED EMBODIMENTS

Figure 1:
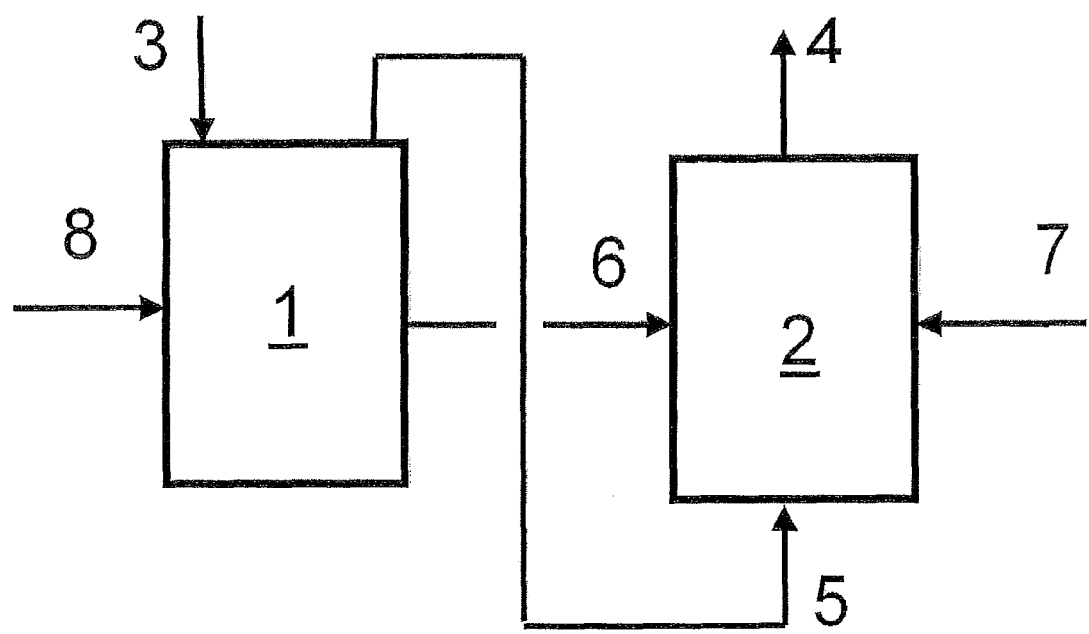
FIG. 1 is a schematic of the inventive concept in an abstract form.

According to FIG. 1, the device according to the invention for producing synthesis gas from biomass consists of two reactors. In the reactor 1, the biomass 3 introduced is decomposed into pyrolysis coke and pyrolysis gas by supplying an amount of heat 8 or by partial oxidation. The pyrolysis coke 6 is introduced into the fluidised bed of a synthesis gas reactor 2. The pyrolysis gas 5 is used as fluidisation gas for the fluidised bed of the synthesis gas reactor 2. By supplying an amount of heat 7 into the synthesis gas reactor or by partial oxidation, the synthesis gas 4 is generated from the pyrolysis coke 6 and the pyrolysis gas 5.

Figure 2:
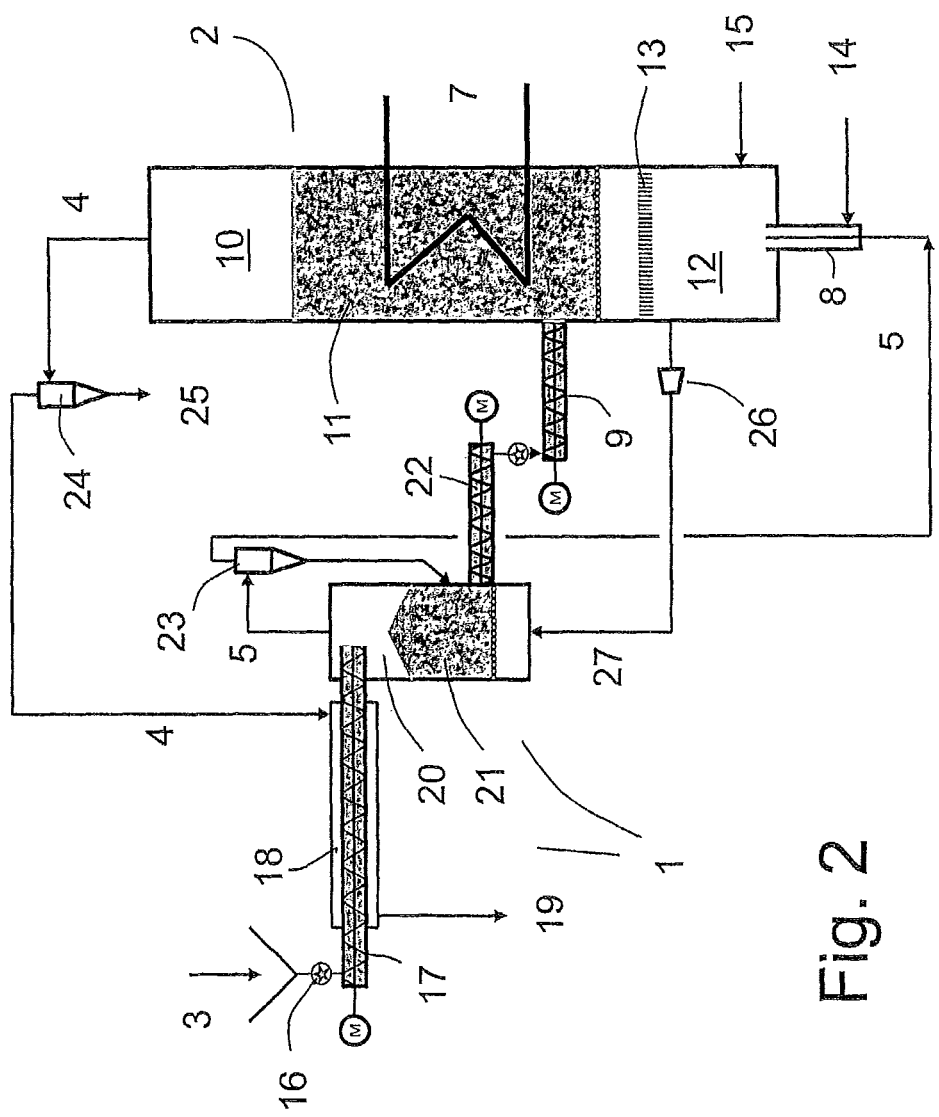
FIG. 2 shows one embodiment of the invention.

FIG. 2 shows a more detailed representation of the concept according to the invention. The pyrolysis 1 consists of a plurality of devices for conveying and pyrolysing the biomass introduced. The biomass 3 is introduced through a rotary valve 16 into a screw conveyor 17 that has a heating jacket 18, through which the hot synthesis gas 4 flows. The synthesis gas then continues to further processing 19. The pyrolysis coke formed in 17 falls into a container 20. The pyrolysis coke 21 is transported by the two screws 22 and 9 into the fluidised bed 11 of the synthesis gas reactor 2. It is expedient to set up a rotary valve between the screws 22 and 9, so that the pyrolysis gas does not reach the synthesis gas reactor 2 along this route.

The pyrolysis gas 5 from the container is freed of dust by a cyclone 23 and introduced at the lower part 12 of the synthesis gas reactor 2. The pyrolysis gas 5 flows through the hot fluidised bed 11, into which an amount of heat 7 is introduced by means of a heating device. In this case, the pyrolysis gas and pyrolysis coke are converted into synthesis gas at from 750° C. to 950° C. and enter the free space 10 of the synthesis gas reactor 2, which is denoted here as a reactor with a stationary fluidised bed. The synthesis gas 4 is freed of dust in the cyclone 24. The ash 25 can be spread onto fields as fertiliser, because it has not melted.

In order to reduce the tar content of the pyrolysis gas 5, it is partially oxidised with oxygen 14 or air by means of a burner 8. It is advantageous to mix gases 15 from the preparation of the synthesis gas, such as methane, with the superheated pyrolysis gas. Depending on the temperature at this point, a large part of the methane is already converted into synthesis gas. Owing to this chemical quenching, the temperature in the space 12 is reduced. Even greater conversion of tars, methane and ammonia can be achieved by a suitable catalyst 13, which is arranged before the nozzle floor of the fluidised bed 11.

With reference to FIG. 1, by the method according to the invention the tar content of the synthesis gas is reduced in particular by not feeding the biomass (3) directly into the synthesis gas reactor (2), but initially cleaving it into pyrolysis gas (5) and pyrolysis coke (6) in a pyrolysis gas reactor (1). Because the pyrolysis gas (5) used as fluidisation gas encounters almost pure carbon, an almost tar-free synthesis gas (4) is produced. The required enthalpy of reaction is provided by means of the heat fluxes (7) and (8).

In order to reduce the content of volatile substances in the pyrolysis coke, hot, substantially de-tarred pyrolysis gas 27 from the space 12 may flow through the pyrolysis coke 21 in the container 20. The pyrolysis gas must in this case be brought to a higher pressure by a compressor 26. Depending on the amount of pyrolysis gas 27 introduced and the design of the container 20, a fluidised bed may also be formed in the pyrolysis coke layer. In the case of a low gas speed, merely a moving bed of pyrolysis coke is formed. The conversion in a fluidised bed is naturally greater. In order to improve the process further, a small substream of the pyrolysis gas 27 may be fed in at the end of the screw 22. In this way, only substantially de-tarred pyrolysis gas enters the fluidised bed through the screw 9.

Figures 3, 4:
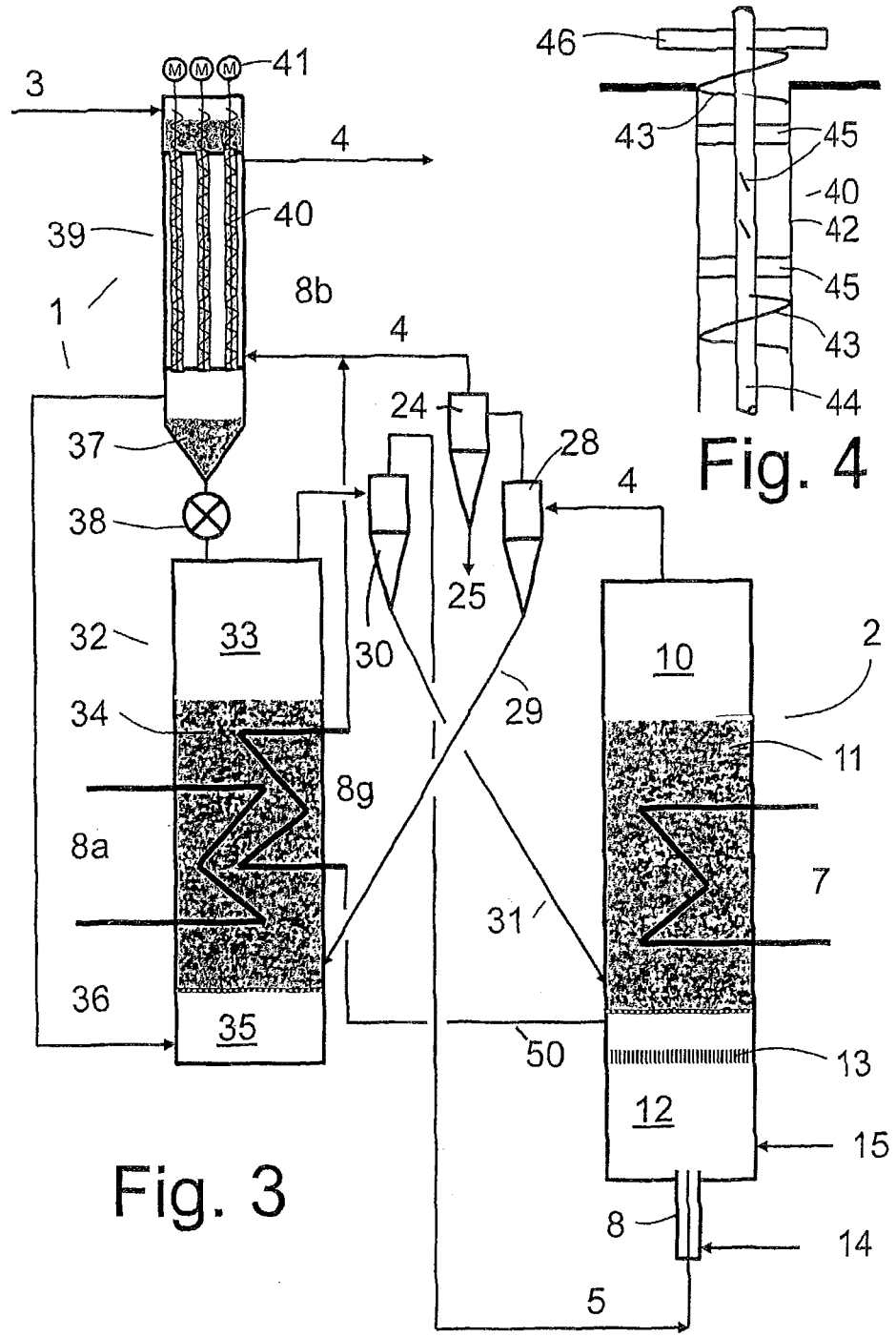
FIG. 3 shows another embodiment of the invention having 2 reactors for the pyrolysis, one of which has a fluidised bed.
FIG. 4 shows further detail of the embodiment shown in FIG. 3.

FIG. 3 shows a device having a low-temperature pyrolyser and a high-temperature pyrolyser for supplying the synthesis gas reactor 2 with pyrolysis gas and pyrolysis coke. The heating of the low-temperature pyrolyser is carried out in this case with the hot synthesis gas 4 which flows around the tubes of the screw conveyors 40 in a similar way to the tubes of a tube bundle heat exchanger. The biomass 3 is delivered at the head of the low-temperature pyrolyser 39. The desired system pressure is applied in this case by upstream equipment (not shown), for example pressure locks. The biomass 3 travels via a multiplicity of screw conveyors 40 into the lower part of the low-temperature pyrolyser 39. From here, the pyrolysis coke 37 is introduced by means of a rotary valve 38 into the high-temperature pyrolyser 32. The pyrolysis gas 36 is introduced into the floor 35 of the high-temperature pyrolyser 32, flows through its fluidised bed 34 and travels through the cyclone 30 as substantially tar-free pyrolysis gas 5 into the synthesis gas reactor 2. The high-temperature pyrolyser 32 and the synthesis gas reactor 2 are configured as reactors with a circulating fluidised bed. These two reactors mutually exchange their bed material, as is done in the case of allothermal gasification according to the prior art between the reactor and the burner. The synthesis gas reactor 2 is in this case the "burner" and the high-temperature pyrolyser is the "reactor". Via the free space 10, the cyclone 28 and the line 29, a large part of the bed material enters the high-temperature pyrolyser 32. At its end, as is conventional, the line 29 has a siphon which is fluidised with process gas or steam. In this way, a large part of the bed material also travels back from the high-temperature pyrolyser 32 via the free space 33, the cyclone 30 and the line 31 into the synthesis gas reactor.

In principle, an amount of heat 7 or 8a, respectively, can be supplied to the two reactors by means of a heater in the fluidised beds. Heating of the high-temperature pyrolyser 32, however, is not necessary since it can in fact be heated by exchange of bed material. Increasing the temperature of the pyrolysis gas 5 before entry into the space 12 is in any event sensible in order to break down high molecular weight compounds, which are generally referred to as tar. This may be done by a heater in the gas stream or, as indicated here, by partial oxidation with oxygen 14 in the burner 8. The heat flux 7 can be reduced in this way. The pyrolysis gas 36 entering the space 35 may also be heated in the same way by partial oxidation.

The purification of the pyrolysis gas 5 by means of the cyclone 30 is only represented symbolically here. In order to ensure sufficient freedom from dust, at least a double cyclone is required as represented for the purification of the synthesis gas by the cyclones 28 and 24. The input cyclone precipitates for the circulating fluidised bed essentially the bed material, for example sand, while the subsequent cyclone precipitates the pyrolysis coke and the ash. The synthesis gas cyclone 24 primarily separates ash 25.

In order to allow a larger control range for the power of the synthesis gas reactor 2, it may be configured for a partial load. For a higher power, a part of the superheated fluidisation gas may then be branched off before entry into the nozzle floor by means of a line 50, and mixed with the synthesis gas 4. In order to use the sensible heat, it is advantageous to introduce this amount of heat 8g into the pyrolysis reactor 32.

FIG. 4 shows the low-temperature pyrolyser 39 of FIG. 3 in detail. A section of a vertically arranged conveyor screw 40 is represented. The conveyor screws are designed and controlled so that they prevent free fall of the biomass being introduced, and allow good material and heat exchange by constant stirring. The screw shaft 44 for this reason has only short sections, which carry a conveyor screw 43. Stirring blades 45 are arranged between them, which stir up the biomass or the pyrolysis coke and thus constantly feed cooler material to the heated screw tube 42. The screws are alternately set in right and left rotation by motors 41 (FIG. 3), specifically so that the biomass being introduced does not stagnate too much at the head of the screw conveyors, and the screw tubes remain well filled. So that the layer over the screw conveyors reaches a uniform height and no cavities are formed over the screw conveyors, stirring blades 46 project into this space and extend as far as the neighbouring screw shaft. Collision can be avoided by height-offset stirring blades 46 or matched, synchronised rotation speed control.

Figure 5:
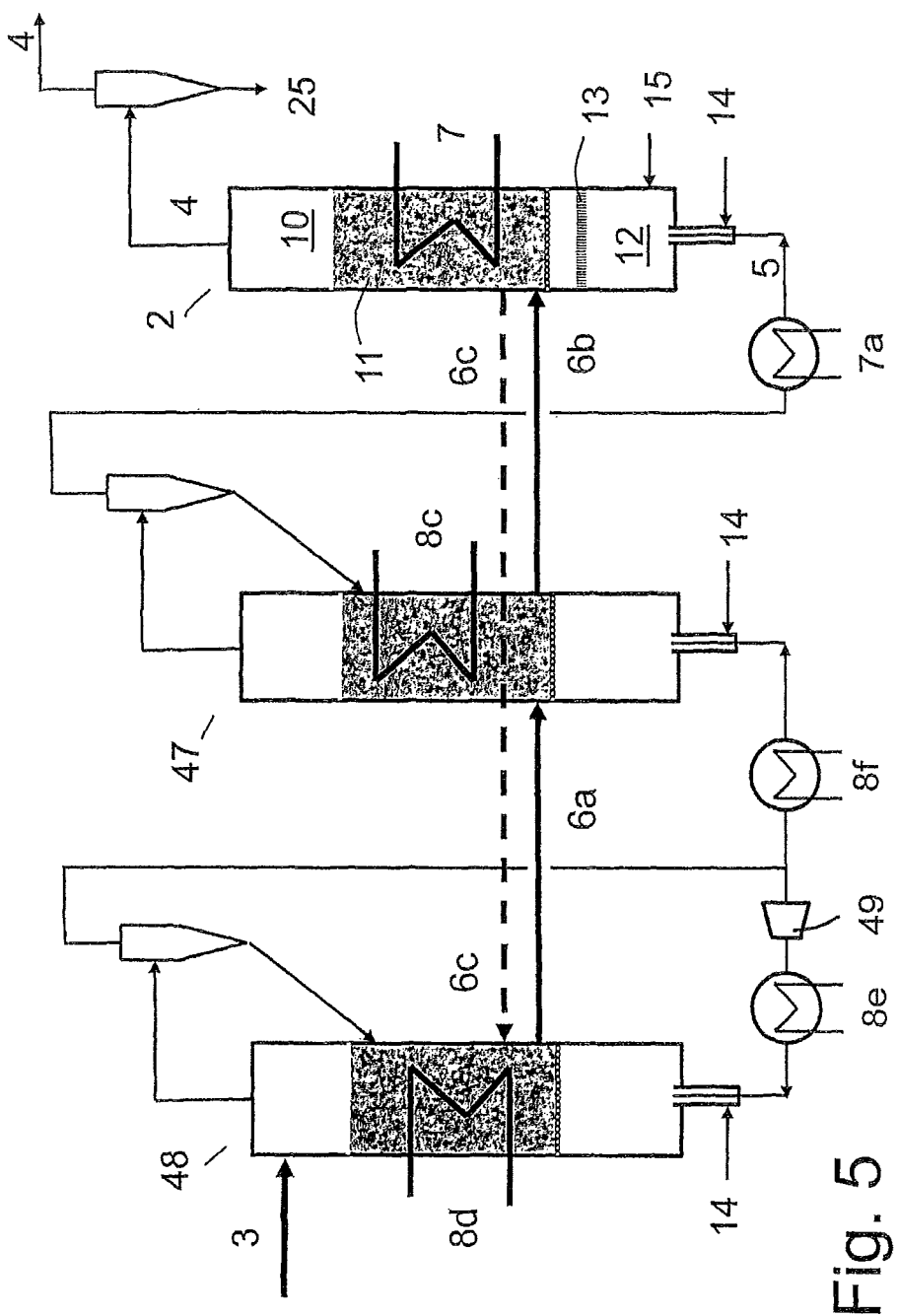
FIG. 5 shows a cascade of pyrolysis reactors according to the invention.

FIG. 5 shows two pyrolysis reactors which, like the synthesis gas reactor 2, have a fluidised bed. The biomass 3 is introduced into a low-temperature pyrolyser 48. The pyrolysis gas is cycled by means of a compressor 49. So that the tubes of this circuit do not need to be heated, the temperature should not fall below 350° C. This reactor should preferably be operated at between 400° C. and 550° C. At these temperatures, heat from the process, for example hot synthesis gas, can still be coupled in well. This heat 8d and 8e may be input directly into the fluidised bed or delivered to the gas circuit. As usual, sand may be used as the inert bed material. The sand being stirred up ensures good comminution of the biomass or the pyrolysis coke, respectively. With this type of reactor, despite low temperatures, a high conversion can be achieved. From the fluidised bed of the low-temperature pyrolyser 48, the bed material travels by means of a conveyor device 6a into the fluidised bed of the high-temperature pyrolyser 47, and from there by means of a conveyor device 6c into the synthesis gas reactor 2. The fluidised bed of the synthesis gas reactor 2 is operated with a low pyrolysis coke content, whereas the pyrolysis coke content is greatest in the low-temperature pyrolyser 48, and in the synthesis gas reactor it is very low. In order to compensate for the extraction of sand through the path 6a, bed material from the synthesis gas reactor is fed back by means of a conveyor apparatus 6c into the low-temperature pyrolyser 48.

The aforementioned conveyor apparatuses may, for example, be screw conveyors. It is also possible to operate the three fluidised bed reactors with a circulating fluidised bed. The bed material will then take the represented path 6a, 6b, 6c via cyclones.

The pyrolysis gas from the low-temperature pyrolyser 48 is used as fluidisation gas for the high-temperature pyrolyser 47. From the latter, the pyrolysis gas 5 travels into the synthesis gas reactor 2. The required heat fluxes 7, 8c, 8d may be introduced directly into the fluidised beds by means of heat exchangers. The introduction of the heat fluxes 7a, 8e, 8f has the same effect. In principle, the required enthalpy of reaction may be applied at least in part by partial oxidation with oxygen 14. The high-temperature pyrolyser 47 is expediently operated at between 600° C. and 800° C. The advantages which result from superheating of the pyrolysis gas 5 with subsequent catalysis have already been described above. All three reactors allow operation both with a stationary fluidised bed and with a circulating fluidised bed.

With the method according to the invention, it is possible to produce a qualitatively very pure synthesis gas by primary measures. This applies in particular to the very low tar content. This saves on elaborate subsequent purification of the synthesis gas and elaborate purification of the waste water. The direct use of the pyrolysis gas as a fluidisation gas for the synthesis gas reactor obviates the additional provision of superheated steam as fluidisation gas. Unlike in the case of fixed bed gasifiers and entrained flow gasifiers, the ash of the biomass can be used as inorganic fertiliser for agriculture. This is a great importance in particular for phosphorus, which is becoming less available.

The invention has been described by way of example above with the aid of exemplary embodiments. It is to be understood that the invention is not restricted to the exemplary embodiments described. Rather, numerous possible variants and modifications will be apparent to the person skilled in the art in the scope of the invention, and the protective scope of the invention is defined in particular by the following patent claims.

The invention claimed is:

1. A method for producing synthesis gas from biomass, comprising:
    a) decomposing the biomass in at least one pyrolysis reactor into pyrolysis coke and pyrolysis gas;
    b) introducing the pyrolysis coke into a fluidised bed of a synthesis gas reactor;
    c) using the pyrolysis gas as fluidisation gas for the synthesis gas reactor; and
    d) superheating the pyrolysis gas before entry into the fluidised bed of the synthesis gas reactor;
    wherein the pyrolysis gas is introduced into the fluidised bed through a nozzle floor.

2. The method according to claim 1, wherein high-temperature pyrolysis is carried out in at least one pyrolysis reactor.

3. The method according to claim 1, wherein the pyrolysis is carried out until so little pyrolysis coke remains for the synthesis gas reactor that it is just sufficient for chemical quenching.

4. The method according to claim 1, wherein at least one pyrolysis reactor contains a fluidised bed.

5. The method according to claim 1, wherein the fluidisation gas flows through a catalyst bed before entry into the fluidised bed of the synthesis gas reactor.

6. The method according to claim 1, wherein gas from further processing of the synthesis gas is mixed with the heated pyrolysis gas before entry into the fluidised bed of the synthesis gas reactor.

7. The method according to claim 1, wherein at least one of the pyrolysis reactors has a multiplicity of externally heated screw conveyors, which are arranged in the manner of a tube bundle heat exchanger.

8. The method according to claim 1, wherein the fluidisation gas is mixed at least partially with a gas at the output of the synthesis gas reactor while circumventing the respective fluidised bed.

9. A device for carrying out the method according to claim 1, wherein the device comprises at least one pyrolysis reactor, at least one synthesis gas reactor, and means for superheating the pyrolysis gas before entry into the fluidised bed of a synthesis gas reactor, wherein the synthesis gas reactor has a nozzle floor for supplying pyrolysis gas and a fluidised bed.

10. The device according to claim 9, wherein at least one pyrolysis reactor contains a fluidised bed.

11. The device according to claim 9, wherein at least one of the pyrolysis reactors has a multiplicity of externally heated screw conveyors, which are arranged in the manner of a tube bundle heat exchanger.

* * * * *